United States Patent
Hook et al.

[15] 3,695,360
[45] Oct. 3, 1972

[54] ROOT CROP HARVESTER

[72] Inventors: Richard Wayne Hook; Richard David Zaun, both of Des Moines, Iowa

[73] Assignee: Deere & Company, Moline, Ill.

[22] Filed: Dec. 17, 1971

[21] Appl. No.: 209,123

[52] U.S. Cl. .................................................. 171/58
[51] Int. Cl. ............................................. A01d 19/02
[58] Field of Search ........ 171/58, 138; 214/519, 521, 214/522, 42

[56] References Cited

UNITED STATES PATENTS 3,294,177  12/1966  Schaal et al. ................. 171/58

FOREIGN PATENTS OR APPLICATIONS 630,812  10/1949  Great Britain ............. 171/138

Primary Examiner—Antonio F. Guida
Attorney—H. Vincent Harsha et al.

[57] ABSTRACT

A root crop harvester includes a main frame, a plurality of digger wheels on the front of the main frame, conveyor means supported on the frame to receive roots from the digger wheels and deliver the same to a transversely extending auger conveyor which moves the roots to a vertical auger conveyor. An additional conveyor mounted on the upper end of the vertical auger conveyor in a root-receiving relationship therewith moves the roots laterally outwardly for deposit in a vehicle moving alongside the harvester or laterally inwardly. A tank attachment is securable to the main frame of the harvester in a position such that a portion of the tank extends under the inner end of the additional conveyor to receive roots deposited over the inner end of the additional conveyor. An unloader conveyor for the tank delivers the roots back to the additional conveyor which will move the roots laterally outwardly for deposit into the vehicle moving alongside the harvester.

14 Claims, 4 Drawing Figures

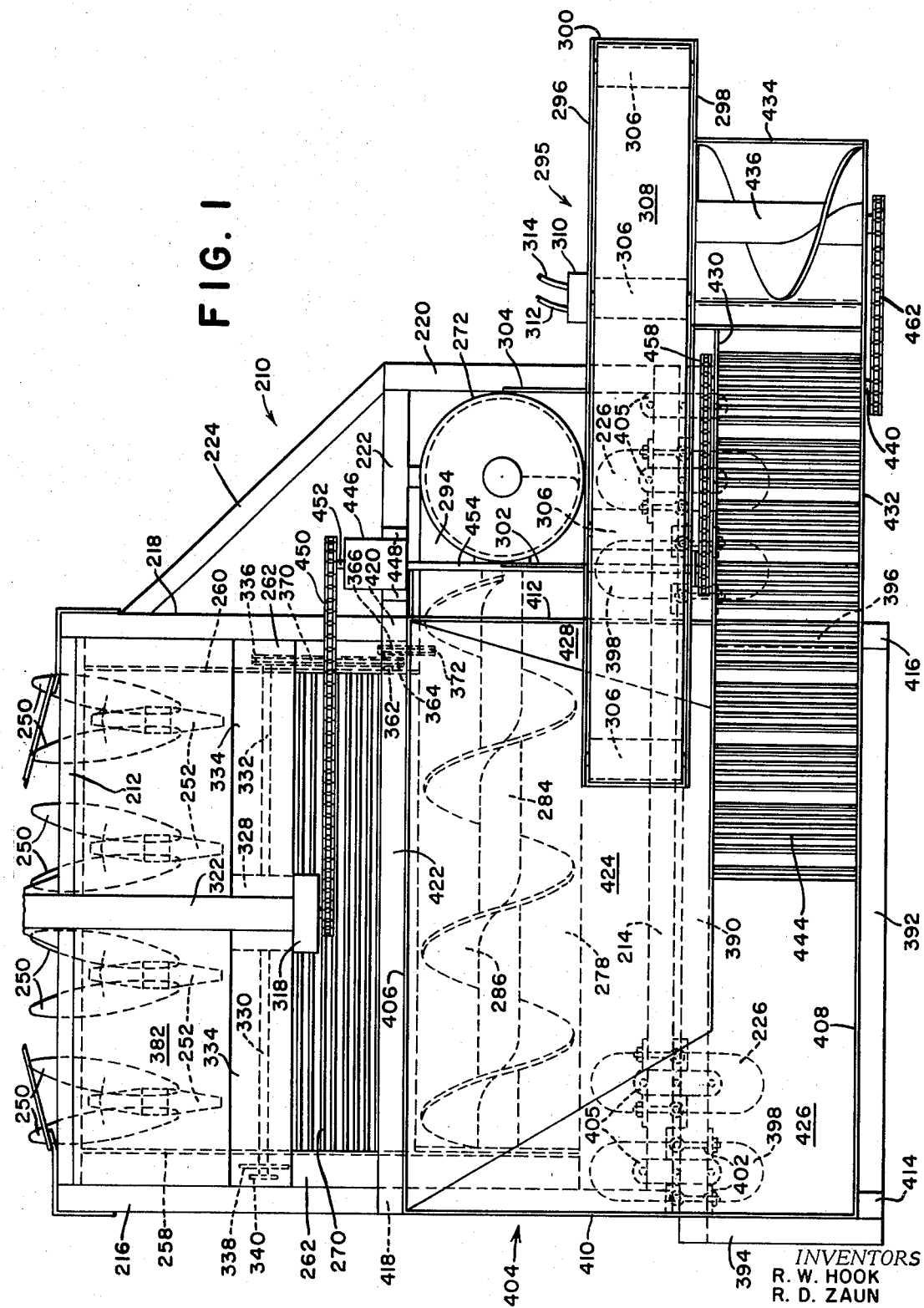

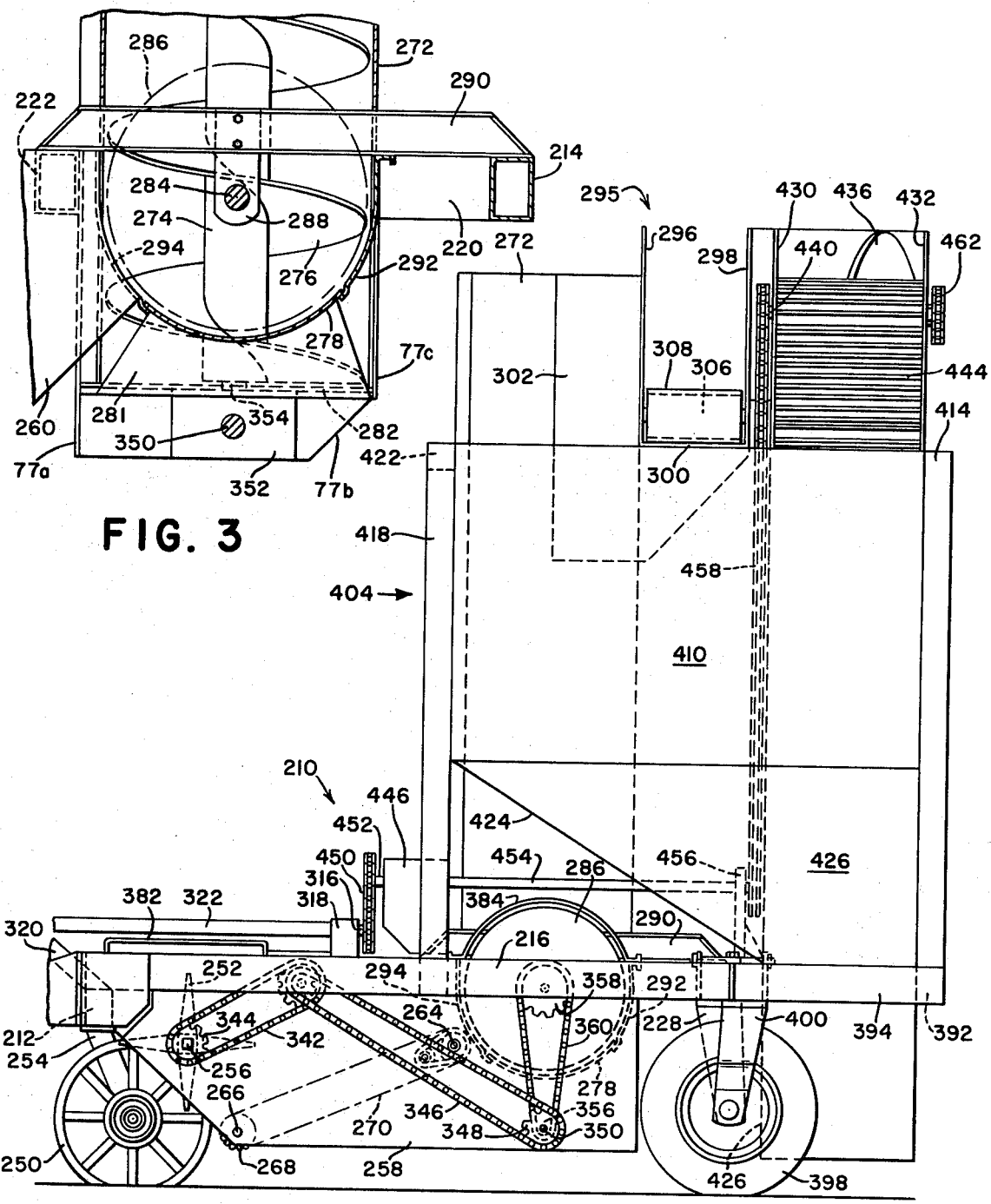

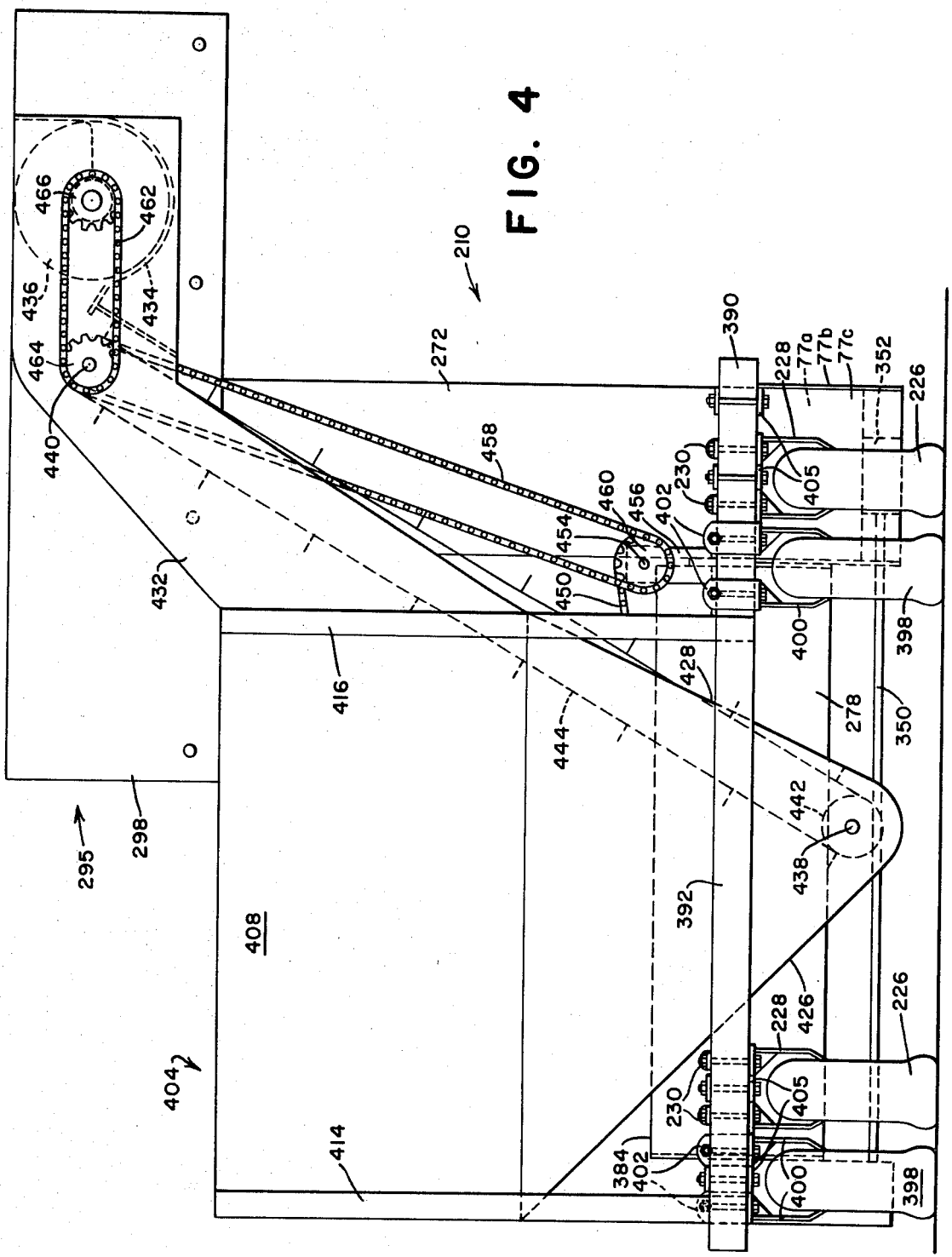

ROOT CROP HARVESTER

CROSS REFERENCE TO RELATED APPLICATIONS

This application discloses subject matter common to copending U.S. application, Ser. No. 209,124, filed concurrently herewith.

BACKGROUND OF THE INVENTION

The present invention relates generally to agricultural harvesting equipment and more particularly relates to harvesters for root crops such as sugar beets. In the following background of the invention and description of a preferred embodiment, the root crop harvester will be described as a sugar beet harvester, but it should be understood that reference is made to sugar beets only for the purpose of providing a specific disclosure and not for limiting the invention.

Until the present invention, there have been basically two types of implements for harvesting sugar beets. One type, commonly referred to as a beet lifter loader, merely digs the beets and conveys the same upwardly and laterally outwardly for deposit into a truck or other vehicle moving alongside the implement. During the first pass through a field with a lifter loader, the truck moving alongside the lifter loader often had to run over unharvested crop and this often required the use of a special vehicle so that the wheel spacing of the vehicle would match row spacings. Also, each time the lifter loader made a turn at the end of the field, it had to wait for the less maneuverable truck and when the truck was full, the lifter loader had to wait for the loaded truck to clear and an empty truck to be positioned. The second type of implement used to harvest beets is generally referred to as a tank harvester and included a tank for temporary storage of beets. The tank harvester dug the beets and conveyed the same upwardly for deposit into the tank. A separate conveyor was used to unload the tank and deposit the beets into a truck or trailer. Since different conveyors were used to load the tank and unload the tank, the beet harvesters were generally much more expensive than the lifter loaders and if the harvester was used as a lifter loader, both conveyors would have to be operated continuously.

SUMMARY OF THE INVENTION

The principal object of the present invention is to provide a tank attachment for a beet lifter loader.

A more specific object of the present invention is to provide a tank attachment for a beet lifter loader which uses a portion of the conveyor system for the lifter loader as a portion of the tank unloading conveyor system.

Another object of the present invention is to provide a tank attachment for a beet lifter loader which is easily attached or detached from the lifter loader and which, when attached to the lifter loader, in no way prevents the lifter loader from functioning strictly as a lifter loader.

Still another object of the present invention is to provide a tank attachment for a beet lifter loader which is easily attached to or detached from the lifter loader and which does not appreciably increase the overall dimensions of the lifter loader.

The above objects and additional objects and advantages of the present invention will become apparent, along with the details of construction of a preferred embodiment of the invention, to those skilled in the art by a reading of the following detailed description when taken in conjunction with the accompanying drawings.

BRIEF DESCRIPTION OF THE DRAWINGS

In the drawings:

FIG. 1 is a top plan view of a beet lifter loader with a tank attachment according to the present invention secured thereto;

FIG. 2 is a side elevational view of the implement illustrated in FIG. 1,

FIG. 3 is an enlarged sectional view taken substantially along the line 3—3 of FIG. 1; and, FIG. 4 is a rear elevational view of the implement illustrated in FIG. 1.

DESCRIPTION OF THE PREFERRED EMBODIMENT

The beet harvester illustrated in the drawings and indicated generally at 210 is, with the exception of the tank attachment, similar to the beet harvester illustrated in the above-mentioned copending U.S. application, Ser. No. 209,124.

The harvester 210 includes a main frame having a front frame member 212, a rear frame member 214, a left side frame member 216, front and rear right side frame members 218 and 220, an intermediate frame member 222, and a brace 224 extending between the front and rear right frame members. The rear of the main frame is supported by a pair of wheels 226 journaled on the lower end of fork members 228 which have their upper ends secured to the rear frame member 214 by clamps 230. By loosening the clamps 230, the fork members 228 and wheels 226 can be adjusted along the rear frame member 214 to compensate for various row spacings.

The forward end of the main frame member is supported by a hitch (undisclosed) which is adapted to have its forward end connected to a tractor drawbar. The details of the hitch form no part of the present invention, but, for an illustration of a preferred hitch, reference can be had to the aforementioned copending U.S. application, Ser. No. 209,124.

A pair of left and right side support plates 258 and 260, respectively, are secured and depend from the main frame and are spaced slightly inwardly from the left and right frame members 216 and 218. Each of the support plates is provided with a flange 262 at its upper end which projects towards and is secured to the respective frame member.

A plurality of digger wheel assemblies are spaced along the front of the main frame and each includes a pair of lifter wheels 250 and a paddle 252. Each pair of lifter wheels is mounted on the lower end of a standard 254 which has its upper end releasably secured to the front frame member 212 by clamps or the like so that the digger wheels can be adjusted along the front frame member to compensate for various row spacings. A non-circular shaft 256 extends between and has its ends journaled in the support plates 258 and 260 by suitable bearings. The paddles 252 are mounted on the shaft 256 for rotation therewith and each is adjustable along the shaft 256 to compensate for various row spacings.

A chain conveyor or potato chain is supported by the support plates 256 and 260 directly behind the digger wheels 250 and includes upper and lower shafts 264 and 266 which are journaled in the support plates. Sprocket wheels 268 are mounted on the shafts 264 and 266 and serve to mount and drive the chain 270. As an alternative to the shaft 266 and sprocket wheels mounted thereon, the lower end of the chain 270 could be mounted on a pair of conventional cantilever-mounted cone rollers.

A vertical auger conveyor is mounted at the right-hand side of the main frame between the rear frame member 214 and intermediate frame member 222 and includes a vertical housing 272. Both ends of the auger housing 272 are closed, but the housing includes a laterally directed opening adjacent its lower end and a rearwardly directed opening adjacent its upper end. An auger including a central core 274 and a helical flighting 276 secured to the central core is journaled within the housing 272 to move beets from the lower opening to the upper opening. Although not illustrated in the drawings or described herein, the vertical auger is preferably of the type illustrated, described and claimed in copending application, Ser. No. 209,116, filed concurrently herewith. Plates 77a, 77b and 77c are secured to the lower end of the auger housing and the main frame at the front, side and rear, respectively, of the auger housing to help secure the auger housing to the main frame and to also provide protection for the lower end of the auger housing, The precise manner in which the vertical auger conveyor is secured to the main frame forms no part of the present invention since numerous alternatives will be apparent to those skilled in the art.

A sheet metal trough 278 extends between the support plate 258 and the opening in the lower portion of the housing 272. The end of the trough 278 adjacent the opening in the housing 272 is provided with a downwardly depending flange 281 which is secured to the bottom wall 282 of the housing 272 to provide support for the trough 278.

A cross auger having a core 284 and a helical flighting 286 secured to the core is mounted for rotation within the trough 278. One end of the cross auger is journaled in the support plate 258 and the other end is journaled in a bracket 288 depending from a crossbar 290 which extends between and is secured to the intermediate frame member 222 and the rear frame member 214. An arcuate shield 292 directly behind the cross auger extends between the support plate 258 and the housing 272 to form a continuation of the trough for the cross auger. The trough 278 and cross auger extend laterally beyond the right side of the potato chain 270 and an arcuate shield 294 directly in front of the cross auger extends between the support plate 260 and the housing 272 to form a front continuation of the trough for the cross auger.

An upper conveyor indicated generally at 295 is secured to the rear of and adjacent the upper end of the vertical auger conveyor in beet-receiving relationship to the opening in the upper end of the housing 272 and includes side walls 296 and 298 and a bottom wall 300. The conveyor 295 is supported by a pair of plates 302 and 304 which are secured to the housing 272 and include a portion projecting under the conveyor 295. The plates 302 and 304 also provide a guide for the beets as they move from the housing 272 to the conveyor 295. A plurality of rollers 306 are journaled between the side walls 296 and 298 and an endless belt or potato chain 308 is trained about the rollers. A reversible hydraulic motor 310 is secured to the side wall 296 and is connected to one of the rollers 306 to drive the endless belt 308. A pair of hydraulic lines 312 and 314 extend from the motor 310 and are adapted to be connected to the conventional hydraulic system on the tractor to which the harvester is coupled. The conveyor 295 extends laterally, both outwardly and inwardly from the vertical auger conveyor, to selectively move the beets in either direction.

The drive train for the driven components of the harvester includes a drive line 316 which has its rear end rotatably supported in a transfer box 318 and intermediate portion journaled on the upper end of a support 320 on the front frame member. A shield 322 for the main drive line extends between the transfer box 318 and the support 320. A sprocket and chain assembly in the transfer box 318 transmits power from the main drive line to a gear box 328 which drives oppositely extending shafts 330 and 332 in opposite directions. The shaft 330 is driven in a counterclockwise direction as viewed from the left, and the shaft 332 is driven in a clockwise direction as viewed from the left. The shafts 330 and 332 project through and are journaled in the support plates 258 and 260 and are covered by shields 334. A sprocket wheel 336 is mounted on the outer end of the shaft 332, and a pair of sprocket wheels 338 and 340 are mounted on the outer end of the shaft 330. A chain 342 is trained about the sprocket wheel 338 and a sprocket wheel 344 on the left-hand end of the shaft 256 to drive the paddles 252 in a counterclockwise direction.

A drive chain 346 is trained about the sprocket wheel 340 and extends downwardly and rearwardly where it is trained about a sprocket wheel 348 mounted on the left end of a shaft 350 which is journaled in the support plate 258 and extends across the harvester to a right-angle gear box 352 secured to the bottom wall 282 of the housing 272. The gear box 352 has an output shaft 354 connected to the core 274 of the vertical auger. An additional sprocket wheel 356 is mounted on the left-hand end of the shaft 350 and is interconnected with a sprocket wheel 358 secured to the left-hand end of the core 284 of the cross auger by a drive chain 360. By having the cross auger and vertical auger driven from the common shaft 350, the two augers remain properly timed for efficient transfer of beets from one auger to the other.

A jackshaft 362 is journaled on the support plate 260 and has a pair of sprocket wheels 364 and 366 mounted thereon. A chain 370 is trained about the sprocket wheels 336 and 364 on the shafts 332 and 362 respectively to drive the shaft 362. A sprocket wheel 372 is mounted on the right-hand end of the shaft 264 and is interconnected with the sprocket wheel 366 by a chain to drive the potato chain 270.

To provide shielding for some of the moving parts and to enhance the appearance of the harvester, a cover shield 382 is mounted on the main frame over the digger wheel assemblies and a cover 384 is mounted on the main frame over the helical flighting 286 of the cross auger.

The operation of the harvester thus far described is as follows. As the implement is moved forwardly, the digger wheels 250 raise the beets to a position where they are contacted by the paddles 252 and thrown rearwardly onto the potato chain 270. The potato chain 270 delivers the beets to the trough 278 where the helical flighting 286 moves them laterally to the vertical auger. The vertical auger elevates the beets to the opening adjacent its upper ends and discharges the beets onto the upper conveyor 295. If the tank attachment to be described hereinafter is not secured to the main frame, the upper conveyor 295 will be driven in a direction to move the beets outwardly for deposit into a vehicle moving alongside the harvester.

The tank attachment according to the present invention has a rigid frame including a front frame member or drawbar 390, a rear frame member 392 and a pair of side frame members 394 and 396 interconnecting the front and rear frame members. The tank attachment frame is supported by a pair of wheels 398 journaled on the lower end of fork members 400 which have their upper ends secured to the toolbar 390 by releasable clamp assemblies 402. The toolbar 390 extends laterally beyond the right side frame member 396 for the purpose of mounting the right-hand wheel 398.

The tank attachment frame is secured to the main frame of the harvester by releasable clamps 405 which rigidly secure the toolbar 390 to the rear frame member 214 of the main frame. As can best be seen in FIGS. 1 and 3, the fork members 228 extend slightly rearwardly and the fork members 400 extend slightly forwardly so that the wheels 226 and 398 are in transverse alignment.

The tank indicated generally at 404 includes a front wall 406, a rear wall 408, a left-hand wall 410 and a right-hand side wall 412. The rear wall 408 extends through the full vertical dimension of the tank and has its upper edge approximately level with the underside of the upper transverse conveyor 295 and its lower edge extending to a level slightly below the drive shaft 250 for the vertical auger conveyor. The rear wall 408 extends alongside the rear frame member 392 and is secured thereto in any suitable manner. A pair of support posts 414 and 416 are secured to the rear frame member 392 in any suitable manner and extend upwardly along the outer edges of the rear wall 408 to provide support therefor.

The front wall 406 is supported by a generally inverted U-shaped support member including a pair of posts 418 and 420 which have their lower ends releasably secured to the side frame members 216 and 218 of the harvester main frame and extend upwardly along the edges of the front wall and an upper transverse member 422 interconnecting the upper ends of the posts 418 and 420 and secured along the upper edge of the front wall 406. The front wall terminates about midway down the vertical dimension of the tank and a bottom wall portion 424 extends from the lower edge of the bottom wall rearwardly and downwardly to the upper rear corner of the toolbar 390. An additional vertical wall 426 extends downwardly from the rear edge of the bottom wall portion 424 along the rear side of the toolbar 390 to a position level with the lower edge of the rear wall 408. The additional vertical wall 426 is secured to the toolbar 390 in any suitable manner. As can be seen in FIGS. 1 and 2, the front wall 406 is positioned slightly forwardly of the transverse auger conveyor and the bottom wall portion 424 overlies the transverse auger conveyor so that a great portion of the tank is positioned over the basic beet harvester and the tank attachment adds very little to the overall dimensions of the beet harvester.

The side wall 410 interconnects the front and rear walls 406 and 408 and has its lower edge terminating level with the lower edge of the front wall 406. An additional bottom wall portion 426 extends from the lower edge of the side wall 410 downwardly and rearwardly, is joined with the bottom wall portion 424, and the lower portion thereof connects the rear wall 408 with the additional vertical wall 426. The right side wall 412 has its front edge interconnected with the front wall 406 and its rear edge lying in a plane parallel with the plane of the rear edge of the toolbar 390. The right side wall 412 terminates in a lower edge level with the lower edge of the front wall 406 and a downwardly and inwardly sloping bottom wall portion 428 interconnects the lower edge of the right side wall 412 and the bottom wall portion 424.

A support frame for an unloading conveyor includes a front wall 430 which is secured to the rear edge of the right side wall 412 and extends upwardly and outwardly therefrom, and a rear wall 432 which may be formed as an integral part of the rear wall 408 of the tank and which extends upwardly and outwardly therefrom. The rear wall 432 extends outwardly beyond the front wall 430 and a trough 434 is secured to the outer end of the rear wall 432 and projects forwardly to the rear wall 298 of the conveyor 295. The trough 434 is secured to the outer end of the front wall 430 of the conveyor support and its forward end can be releasably secured to the rear wall 298 of the conveyor 295 in any suitable manner. The rear wall of the conveyor 298 is also provided with a suitable opening to establish communication between the trough 434 and the upper conveyor 295. A short auger 436 is journaled in the trough 434 to deliver beets deposited in the trough to the conveyor 295. The rear end of the auger 436 is journaled in and cantilevered on the wall 432 of the conveyor support frame.

A lower cross shaft 438 is journaled in the lower portion of the rear wall 408 of the tank 404 and in the lower portion of the additional vertical wall 426, and an upper shaft 440 is journaled between the wall 430 and 432 of the conveyor support. Sprocket wheels 442 are mounted on the shafts 438 and 440 and serve to mount a potato chain 444 which will elevate beets from the lower portion of the tank 404 to the trough 434.

The drive mechanism for the tank unloading conveyor includes a combined reduction gearbox and electric clutch assembly 446 which is releasably mounted on the frame member 222 of the harvester main frame by a pair of brackets 448. A drive chain 450 interconnects a pair of sprocket wheels mounted on the extreme rear end of the main drive shaft 316 and the input shaft 452 of the gearbox 446. The output shaft 454 of the gearbox 446 extends rearwardly above the cross bar 290 and has its rear portion supported by a bracket 456 which is secured to the toolbar 390 in any suitable manner. A chain 458 interconnects a sprocket wheel 460 on the rear end of the shaft 454 with a sprocket wheel on the forward end of the shaft 440 to drive the potato chain 444. The auger 436 is driven by a chain 462 which interconnects sprocket wheels 464 and 466 on the rear end of the shaft 440 and the rear end of the auger 436 respectively.

With the tank attachment secured to the main frame of the beet harvester, the beet harvester can still be utilized as a basic lifter loader by having the upper conveyor 295 deliver the beets outwardly for deposit into a truck moving alongside the harvester. However, by merely reversing the direction of fluid flow through the hydraulic motor 310, the direction of the belt 308 is reversed and the beets deposited on the upper conveyor 295 are moved inwardly for deposit into the tank 404. When it is desired to empty the tank 404, the hydraulic motor 310 is again reversed so that the belt 308 will move beets outwardly and the clutch 446 is engaged to drive the unloader conveyor 444 and the auger 436 so that the beets in the tank 404 are conveyed upwardly and outwardly and then forwardly for deposit onto the belt 308.

With the use of the tank attachment, it is possible to use the basic harvester as both a lifter loader and a tank harvester. For example, during the first pass through the field, the harvested beets will be deposited in the tank 404, and then, without stopping the harvester, during the second pass through the field, a truck will be aligned under the outer end of the upper conveyor 295 and moved alongside the harvester. As soon as the truck is aligned alongside the harvester, the hydraulic motor 310 will be reversed so that the harvested beets will be deposited over the outer end of the upper conveyor 295 and into the truck. Also, the clutch 446 will be engaged so that beets harvested during the first pass through the field will be deposited onto the belt 308 by the unloader conveyor 444 and auger 436 so that the tank is unloaded without stopping or slowing down the harvesting in any manner. Also, when the harvester reaches the end of the field and is about to make a turn for an additional pass through the field, the conveyor 310 can be driven in a direction to deposit the beets in the tank 404 so that the harvester can turn around and start its next pass through the field without waiting for the truck, which is not as maneuverable as the harvester, to be turned for the subsequent pass and realigned under the conveyor 295. Then, as soon as the truck is realigned, the tank can again be emptied without stopping or in anyway slowing down the harvesting process.

From the foregoing description, it can be seen that the present invention provides a tank attachment for a beet harvester which makes it possible to utilize the harvester as either a lifter loader or a tank harvester, in which the unloading conveyor for the tank does not have to be driven when the implement is being used as a lifter loader, and which uses a common conveyor when functioning as a lifter loader or a tank harvester. It can also be seen that the tank attachment according to the present invention is easily attached or detached from the basic harvester so it can be purchased separately from the harvester and attached whenever needed, can be detached when its use is not desired.

Although only a single preferred embodiment of the invention has been described and illustrated, various modifications within the spirit and scope of the invention will become apparent to those skilled in the art and can be made without departing from the underlying principles of the invention. Therefore, the invention should not be limited by the specific illustration and description, but only by the following claims.

We claim:

1. A root crop harvester comprising: a main frame; wheel means secured to and supporting the rear of the main frame; a forwardly extending hitch member secured to the main frame; root digging means secured to and depending from the front of the main frame; elevator means carried by the main frame adjacent one side thereof; conveyor means supported by the main frame for receiving roots from the root digging means and moving the same to the elevator means; reversible conveyor means carried at the upper end of the elevator means for receiving roots therefrom and moving the same laterally to either an inner or outer deposit area; a transversely extending toolbar; means rigidly securing the toolbar to the rear of the main frame; a tank mounted on the toolbar with at least a portion thereof extending under the inner deposit area; and additional conveyor means supported on the tank and mounted to move roots from the bottom of the tank to the reversible conveyor means.

2. A root crop harvester as set forth in claim 1 wherein a portion of the tank extends rearwardly of the toolbar and a portion extends forwardly of the toolbar and overlies at least a portion of the first-mentioned conveyor means.

3. A root crop harvester as set forth in claim 2 wherein the portion of the tank extending rearwardly of the toolbar also extends below the toolbar, one end of the additional conveyor means is positioned in the lower rear portion of the tank, and the bottom of the forward portion of the tank slopes downwardly and rearwardly.

4. A root crop harvester as set forth in claim 2 wherein the reversible conveyor is mounted on the elevator means intermediate its ends and extends laterally outwardly from the upper end of the elevator means and laterally inwardly from the upper end of the elevator means, and the inner and outer deposit areas are defined by the inner and outer ends of the reversible elevator means.

5. A root crop harvester comprising: a main frame having transversely extending front and rear frame members; wheel means secured to and supporting the rear of the main frame; a hitch member secured to the main frame and adapted to be attached to a tractor for at least partially supporting the front of the main frame; root digging means secured to and depending from the front frame member; elevator means carried by the main frame adjacent one side thereof; conveyor means supported by the main frame for receiving roots from the root digging means and moving the same to the elevator means; drive means supported on the main frame and operatively connected to the conveyor means and elevator means for driving the same; the drive means including a drive shaft extending generally forwardly along the hitch means for connection with the tractor; upper conveyor means including reversible drive means carried at the upper end of the elevator means for receiving roots therefrom and moving the same laterally to either an inner or outer deposit area; a transversely extending toolbar; releasable means rigidly securing the toolbar to the rear frame member; a root storage tank mounted on the toolbar with at least a portion thereof underlying the inner deposit area; additional conveyor means supported on the storage tank and mounted to move roots from the bottom of the storage tank to the upper conveyor means; and selectively engageable and disengageable auxiliary drive means operatively coupled to the additional conveyor means to drive the additional conveyor means.

6. A root crop harvester as set forth in claim 5 wherein the auxiliary drive means is operatively coupled between the first-mentioned drive means and the additional conveyor means and includes selectively engageable and disengageable clutch means. by ends of the upper conveyor means.

7. A root crop harvester as set forth in claim 5 wherein the toolbar is secured to the back of the rear frame member; additional wheel means are secured to and support the toolbar, and the additional wheel means are positioned slightly forwardly of the rear toolbar in transverse alignment with the first-mentioned wheel means.

8. A root crop harvester as set forth in claim 7 wherein a rear portion of the storage tank extends rearwardly of the toolbar, a forward portion of the storage tank overlies at least a portion of the first-mentioned conveyor means and includes a bottom sloping downwardly and rearwardly toward the rear portion, and one end of the additional conveyor means is mounted in the bottom of the rear portion of the tank.

9. A root crop harvester as set forth in claim 8 wherein the upper conveyor means is mounted on the elevator means intermediate its ends which extend laterally outwardly from the elevator means and laterally inwardly from the elevator means over a generally central portion of the storage tank, and the inner and outer deposit areas are defined by the ends of the upper conveyor means.

10. In combination with a root crop harvester including a main frame having transversely extending front and rear frame members, wheel means secured to and supporting the rear of the main frame, hitch means secured to the main frame and adapted to be connected to a tractor for at least partially supporting the front of the main frame, root digging means secured to and depending from the front frame member; elevator means mounted on the main frame adjacent one side thereof, conveyor means supported on the main frame for receiving roots from the root digging means and moving the same to the elevator means, drive means for the elevator means and conveyor means mounted on the main frame and having a main drive shaft extending generally forwardly along the hitch means for connection with the tractor, elongated upper conveyor means mounted intermediate its ends on the upper end of the elevator means for receiving roots therefrom and having its ends extending laterally outwardly from the elevator means and laterally inwardly from the elevator means, and reversible drive means for the upper conveyor means, a tank attachment comprising: a transversely extending toolbar; additional wheel means secured to and supporting the toolbar; means for releasably securing the toolbar to the back of the rear frame member; a storage tank mounted on the toolbar and including a portion positioned under the inner end of the upper conveyor means when the toolbar is connected to the rear frame member; additional conveyor means supported on the storage tank and mounted to move roots from the bottom of the storage tank to the upper conveyor means when the toolbar is secured to the rear frame member; and additional drive means for the additional conveyor means including means for selectively coupling and uncoupling the additional drive means with the first-mentioned drive means.

11. The combination set forth in claim 10 wherein the storage tank extends rearwardly of the toolbar, one end of the additional conveyor means is mounted in the bottom of the rear portion of the storage tank, and the forward portion of the storage tank overlies at least a portion of the first-mentioned conveyor means and includes a bottom wall sloping downwardly and rearwardly toward the rear portion of the storage tank.

12. A root crop harvester comprising: a main frame having transversely extending front and rear frame members; wheel means secured to and supporting the rear of the main frame; hitch means secured to the main frame and adapted to be connected to a propelling tractor for at least partially supporting the front of the main frame; root digging means secured to and depending from the front frame member; first conveyor means supported from the main frame behind the root digging means for receiving roots therefrom and moving the same upwardly and rearwardly; trough means supported from the main frame and extending transversely across the rear of the first conveyor means in root-receiving relationship thereto; an auger journaled in the trough means for moving roots deposited therein to one end thereof; a generally vertical auger conveyor means supported on the main frame with its lower end in root-receiving relationship with the trough means; drive means for the first conveyor, the auger and the auger conveyor supported on the main frame and including a main drive shaft extending generally forwardly along the hitch means for connection with the tractor; an elongated, generally horizontal and transversely extending upper conveyor mounted on the upper end of the auger conveyor intermediate its ends in root-receiving relationship thereto; reversible drive means for the upper conveyor means; a transversely extending toolbar; means rigidly securing the toolbar to the rear frame member; a root storage tank mounted on the toolbar with at least a portion thereon positioned under the inner end of the upper conveyor; additional conveyor means supported by the storage tank and mounted to move roots from the bottom of the storage tank to the upper conveyor means; and additional drive means coupled between the additional conveyor means and the first-mentioned drive means.

13. A root crop harvester as set forth in claim 12 wherein the additional drive means includes selectively engageable and disengageable clutch means.

14. A root crop harvester as set forth in claim 13 wherein the rear portion of the storage tank extends rearwardly of the toolbar, one end of the additional conveyor means is mounted in the bottom of the rear portion of the storage tank, the forward portion of the storage tank overlies the transversely extending trough means and has a bottom wall sloping downwardly and rearwardly toward the rear portion.

* * * * *

UNITED STATES PATENT OFFICE
CERTIFICATE OF CORRECTION

Patent No. 3,695,360     Dated   3 October 1972

Inventor(s) Richard Wayne Hook and Richard David Zaun

It is certified that error appears in the above-identified patent and that said Letters Patent are hereby corrected as shown below:

Column 9, lines 18 and 19, cancel "by ends of the upper conveyor means."

Signed and sealed this 6th day of March 1973.

(SEAL)
Attest:

EDWARD M. FLETCHER, JR.                ROBERT GOTTSCHALK
Attesting Officer                      Commissioner of Patents